United States Patent
Ishigami et al.

(10) Patent No.: US 9,028,156 B2
(45) Date of Patent: May 12, 2015

(54) OPTICAL MODULE AND SIGNAL TRANSMISSION MEDIUM

(71) Applicant: Hitachi Cable, Ltd., Tokyo (JP)

(72) Inventors: Yoshiaki Ishigami, Hitachi (JP); Yoshinori Sunaga, Hitachinaka (JP); Kinya Yamazaki, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 22 days.

(21) Appl. No.: 13/667,122

(22) Filed: Nov. 2, 2012

(65) Prior Publication Data

US 2013/0108224 A1 May 2, 2013

(30) Foreign Application Priority Data

Nov. 2, 2011 (JP) .................. 2011-240852

(51) Int. Cl.
*G02B 6/36* (2006.01)
*G02B 6/12* (2006.01)
*G02B 6/28* (2006.01)
*G02B 6/42* (2006.01)
*G02B 6/30* (2006.01)

(52) U.S. Cl.
CPC .............. *G02B 6/4284* (2013.01); *G02B 6/428* (2013.01); *G02B 6/423* (2013.01); *G02B 6/4249* (2013.01)

(58) Field of Classification Search
CPC ....... G02B 6/43; G02B 6/4249; G02B 6/4292
USPC .............................. 385/14, 24, 53, 76, 88–92
See application file for complete search history.

(56) References Cited

U.S. PATENT DOCUMENTS 7,537,396 B2 * 5/2009 Nagasaka .................. 385/92

FOREIGN PATENT DOCUMENTS

| JP | 2003-133631 A | 5/2003 |
| JP | 2007-177086 A | 7/2007 |
| JP | 2008-009333 | 1/2008 |

OTHER PUBLICATIONS

Japanese Office Action dated Nov. 4, 2014 issued in Patent Application No. 2011-240852 (in English and in Japanese).

* cited by examiner

*Primary Examiner* — Akm Enayet Ullah
*Assistant Examiner* — Michael Mooney
(74) *Attorney, Agent, or Firm* — Scully, Scott, Murphy & Presser, P.C.

(57) ABSTRACT

An optical module includes a photoelectric conversion element optically connected to an optical fiber, a plate-shaped substrate mounting the photoelectric conversion element, coupling members fixed to both end portions of the substrate so as to sandwich the photoelectric conversion element, and a cover member coupled to the substrate by the coupling members so as to cover at least a portion of the substrate.

13 Claims, 15 Drawing Sheets

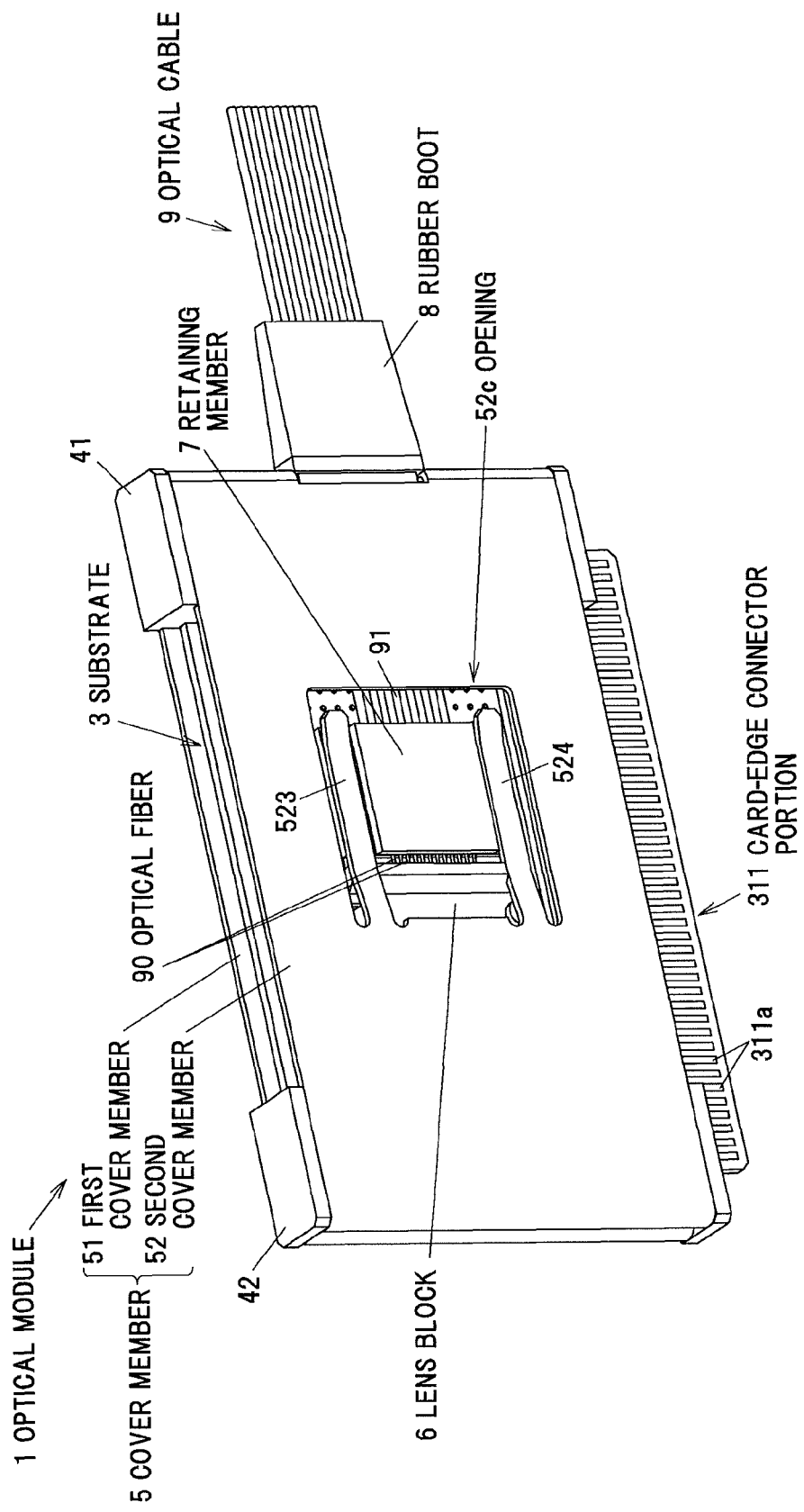

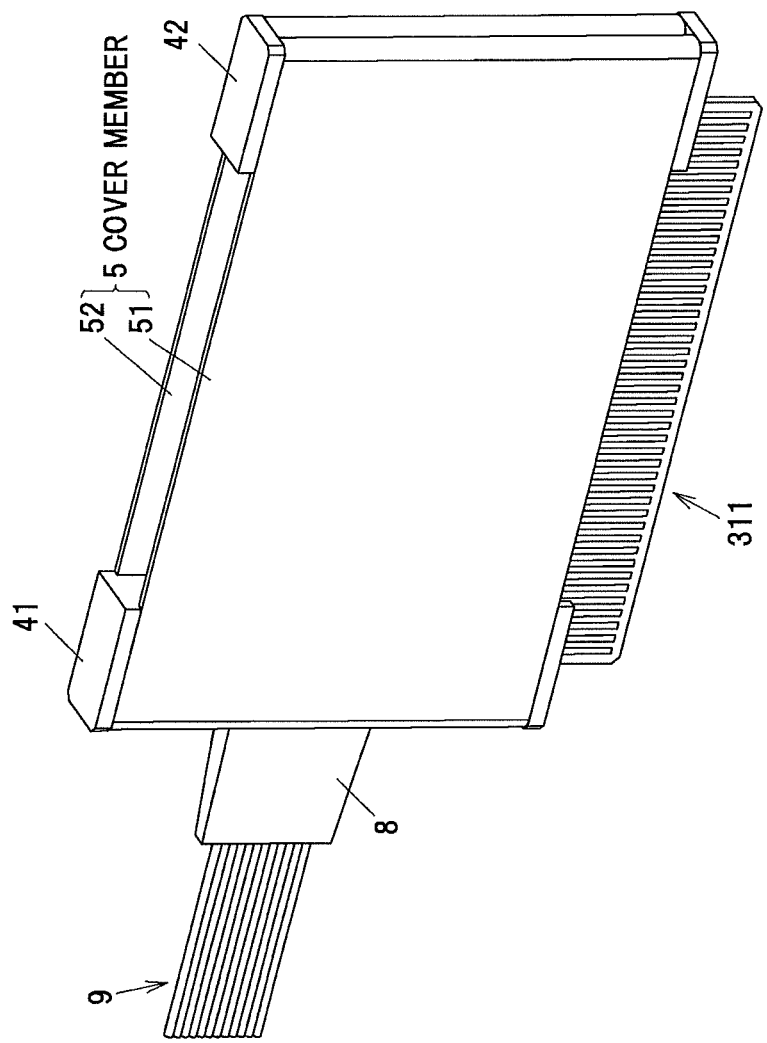

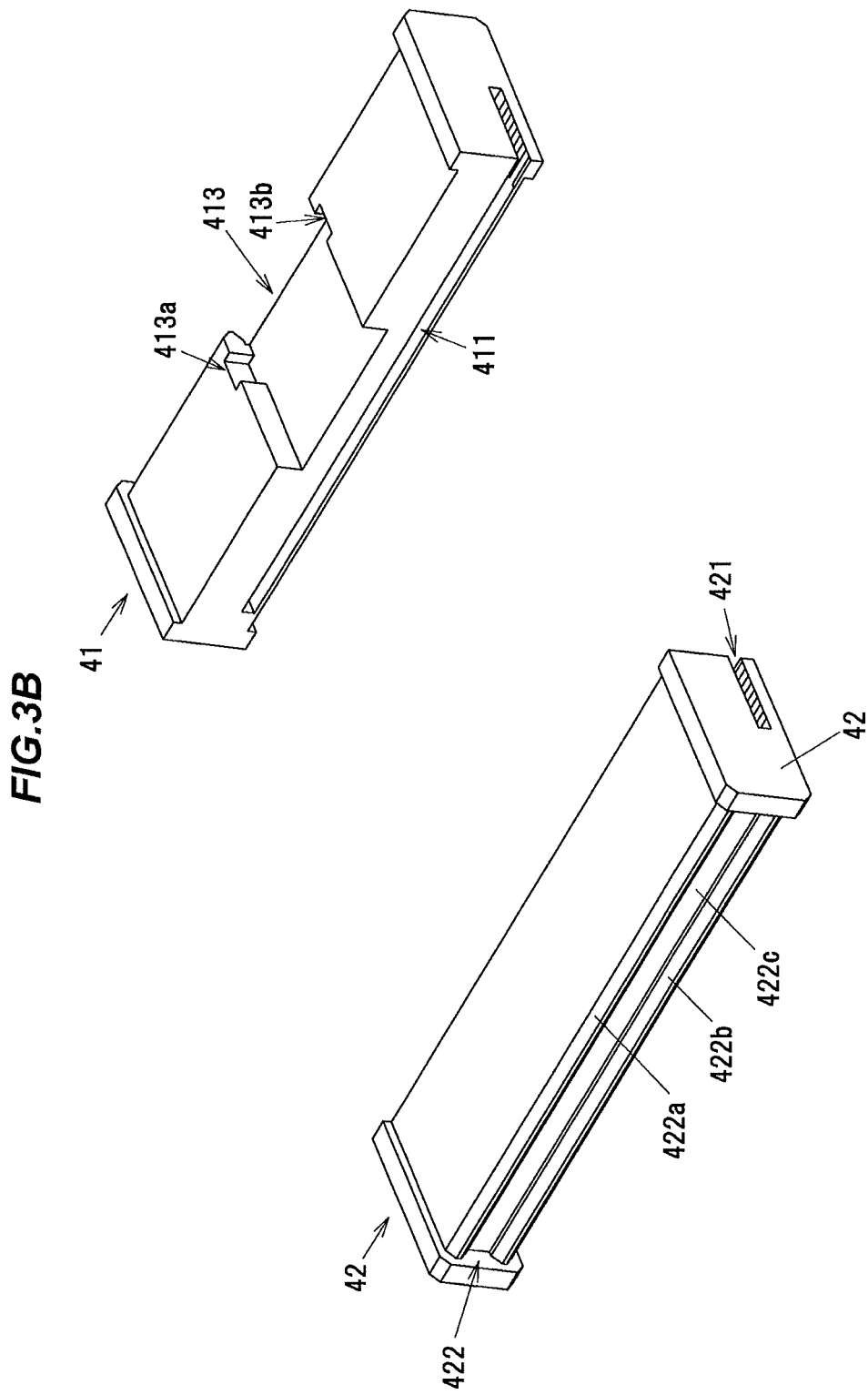

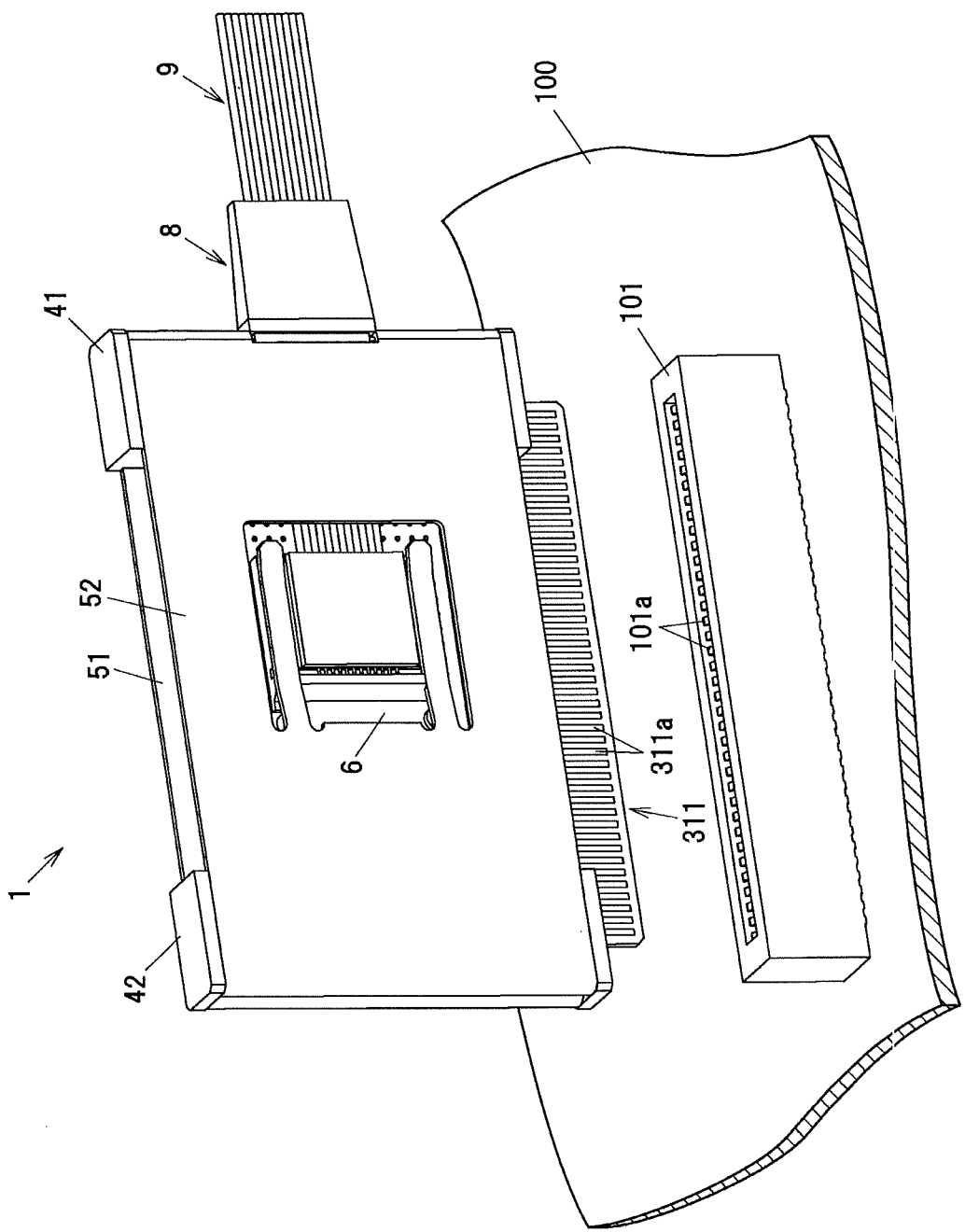

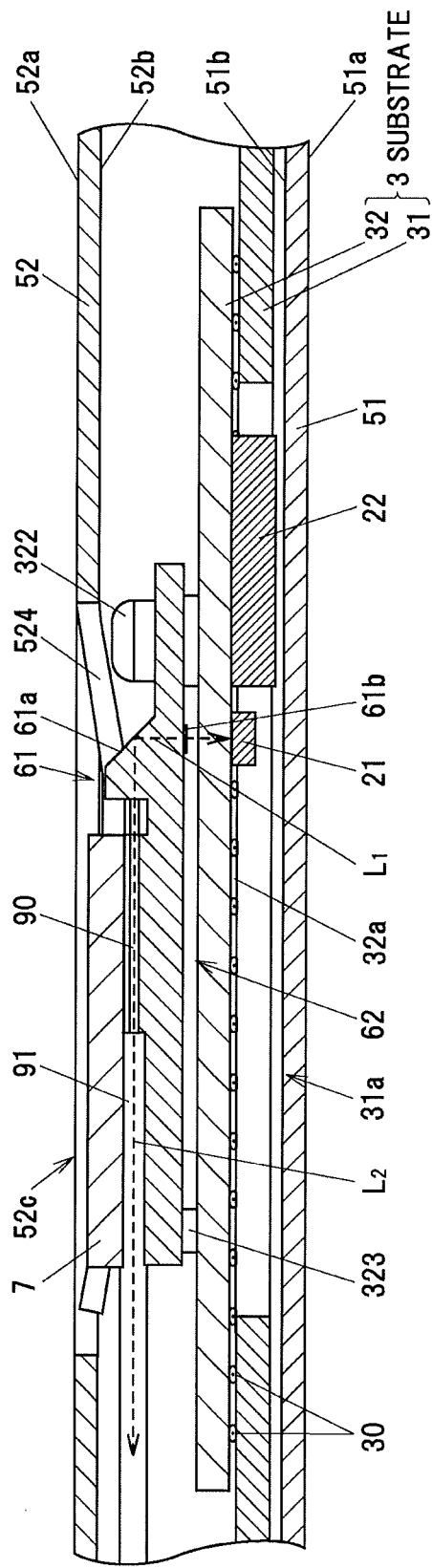

I # OPTICAL MODULE AND SIGNAL TRANSMISSION MEDIUM

The present application is based on Japanese patent application No. 2011-240852 filed on Nov. 2, 2011, the entire contents of which are incorporated herein by reference.

BACKGROUND OF THE INVENTION

1. Field of the Invention

The invention relates to an optical module which transmits signals through an optical fiber, and a signal transmission medium using the optical module.

2. Description of the Related Art

An optical module is known which is provided with a photoelectric conversion element for converting electrical energy into optical energy and vise versa, and transmits or receives signals through an optical fiber (see JP-A-2008-9333).

JP-A-2008-9333 discloses an optical interconnection module provided with an optical device transmitting or receiving light to or from an optical fiber, a flexible substrate mounting the optical device and a shielding case formed of a sheet metal to house the flexible substrate and the optical device, wherein the flexible substrate is folded along an inner surface of a sidewall of the shielding case such that the optical device faces an end face of the optical fiber.

SUMMARY OF THE INVENTION

According as the recent technological advances in performance of electronic devices such as computers, a high-density package is demanded for an electronic circuit board to mount a CPU (Central Processing Unit) etc. That is, in a high-speed serial transmission at, e.g., more than 10 Gbps, a long signal transmission path may cause an increase in transmission loss and the problem of differential skew (i.e., a time difference in signal synchronization between plural signal lines on a receiving side). Therefore, the distance between the respective components mounted on the electronic circuit board needs to be as short as possible. In other words, the area on the circuit board occupied by the respective components needs to be as small as possible.

In the optical interconnection module disclosed by JP-A-2008-9333, since the flexible substrate is folded in the shielding case, the downsizing of the flexible substrate in each direction along the mounting surface is limited. In addition, it is necessary to fold the shielding case while housing the flexible substrate and the optical device therein. Therefore, the utmost care is needed to manufacture the shielding case and the number of manufacturing steps is increased. These will cause an increase in the manufacturing cost.

Accordingly, it is an object of the invention to provide an optical module that is downsized in a thickness direction and is easy to assemble, as well as to provide a signal transmission medium using the optical module.

(1) According to one embodiment of the invention, an optical module comprises:

a photoelectric conversion element optically connected to an optical fiber;

a plate-shaped substrate mounting the photoelectric conversion element;

coupling members fixed to both end portions of the substrate so as to sandwich the photoelectric conversion element; and a cover member coupled to the substrate by the coupling members so as to cover at least a portion of the substrate.

In the above embodiment (1) of the invention, the following modifications and changes can be made.

(i) The coupling members comprise a first coupling member fixed to one end portion of the substrate and a second coupling member that is formed separately from the first coupling member and is fixed to the other end portion of the substrate opposite to the one end portion.

(ii) A direction of light to be inputted to or outputted from the photoelectric conversion element is orthogonal to the substrate, wherein the optical module further comprises an optical path conversion member to redirect an optical path of the light between the photoelectric conversion element and the optical fiber, and wherein the optical path conversion member is pressed against and fixed to the substrate by the cover member.

(iii) The cover member comprises a pair of pressing portions that are formed by bending a portion in a region facing the optical path conversion member toward the substrate, and wherein the optical path conversion member comprises a pair of receiving portions in contact with the pair of pressing portions to receive a pressing force toward the substrate.

(iv) The cover member further comprises an opening formed in a region between the pair of pressing portions.

(v) The optical module further comprises:

an elastic member that comprises an insertion hole formed therein for inserting the optical fiber and elastically supports the optical fiber, wherein the elastic member is at least partially housed in a recessed portion formed on the coupling member and is supported by the cover member that faces the elastic member.

(vi) The cover member is formed such that both end portions thereof are folded back toward the photoelectric conversion element so as to be engaged with the coupling member, and wherein the coupling member comprises an engaging portion for engaging with the both end portions of the cover member.

(vii) The substrate comprises, at an end portion thereof, a card-edge connector portion having a plurality of electrical contacts formed thereon, and wherein an optical path on the optical fiber side to be redirected by the optical path conversion member is orthogonal to a direction of inserting the card-edge connector portion into an other connector.

(viii) The cover member comprises a first cover member facing a first principal surface of the substrate and a second cover member facing a second principal surface of the substrate, the first principal surface being on a photoelectric conversion element mounting side and the second principal surface being opposite to the first principal surface.

(ix) The cover member comprises a plate-shaped metal.

(2) According to another embodiment of the invention, a signal transmission medium comprises:

an optical fiber; and a pair of the optical module according to the above embodiment (1) that is respectively provided on both end portions of the optical fiber to transmit signals through the optical fiber.

Effects of the Invention

According to one embodiment of the invention, an optical module can be provided that is downsized in a thickness direction and is easy to assemble, as well as a signal transmission medium using the optical module.

BRIEF DESCRIPTION OF THE DRAWINGS

Next, the present invention will be explained in more detail in conjunction with appended drawings, wherein:

FIG. 1A is a perspective view showing an optical module in an embodiment with an optical cable;

FIG. 2A is a perspective view showing the optical module when viewed from the opposite side to that in FIG. 1A;

FIG. 3B is the perspective view of FIG. 3A in which illustration of the first substrate is omitted;

FIGS. 7A to 7D show a lens block, wherein FIG. 7A is a plan view, FIG. 7B is a front view, FIG. 7C is a right side view and FIG. 7D is a bottom view;

FIG. 8A is a perspective view showing a state before a card-edge connector portion of the optical module is inserted into an other connector;

FIG. 9 is a cross sectional view showing a main section of the optical module.

DETAILED DESCRIPTION OF THE PREFERRED EMBODIMENTS

Embodiments

An optical module in an embodiment of the invention and a structural example of a signal transmission medium will be described below in reference to FIGS. 1A to 10. The optical module and the signal transmission medium are used for signal transmission between, e.g., plural electronic circuit boards which are housed in a rack.

Overall Structure of the Optical Module

Figure 1B:
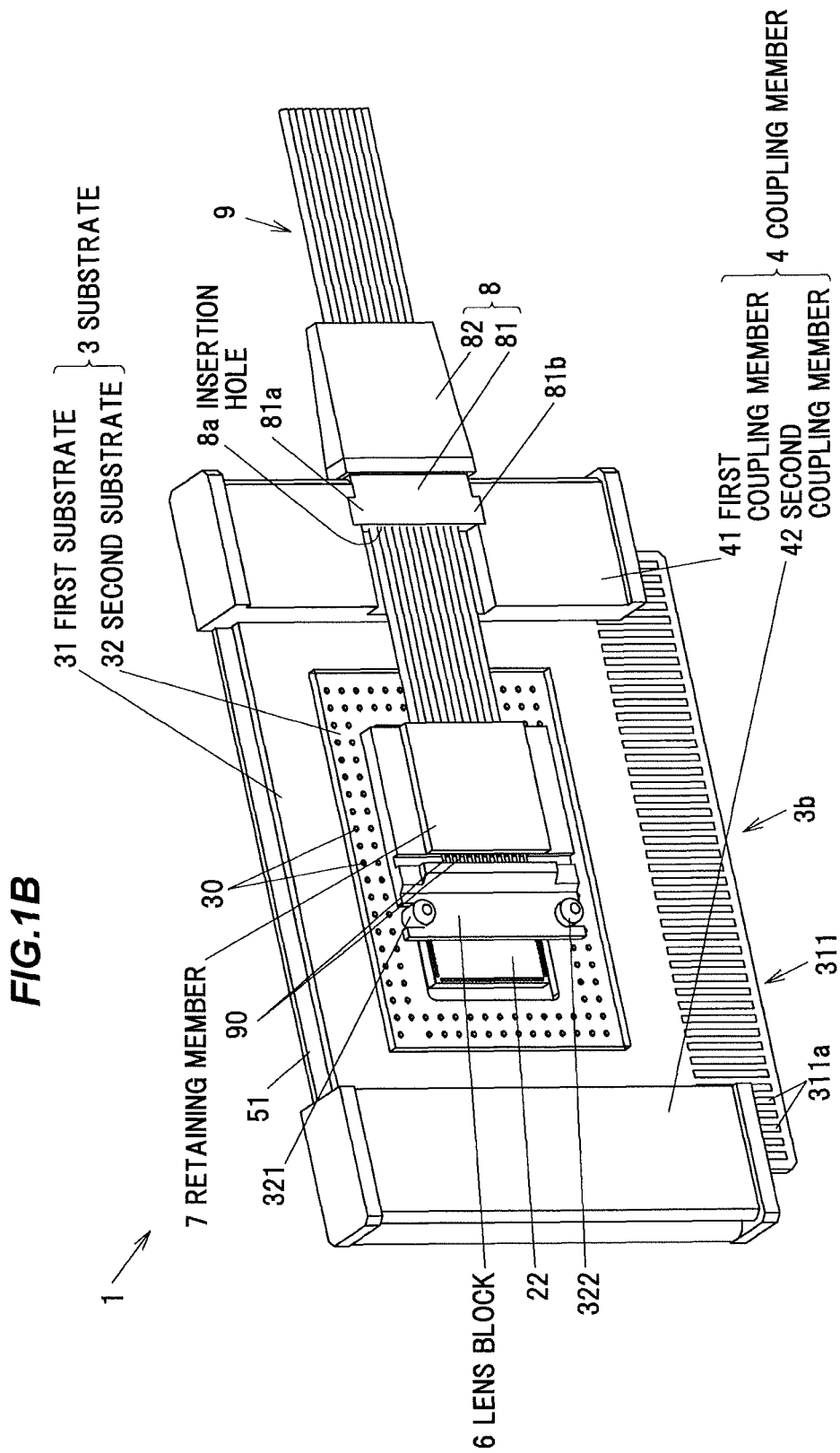
FIG. 1B is a perspective view showing the optical module shown in FIG. 1A in a state that a second cover member is removed.
Figure 2B:
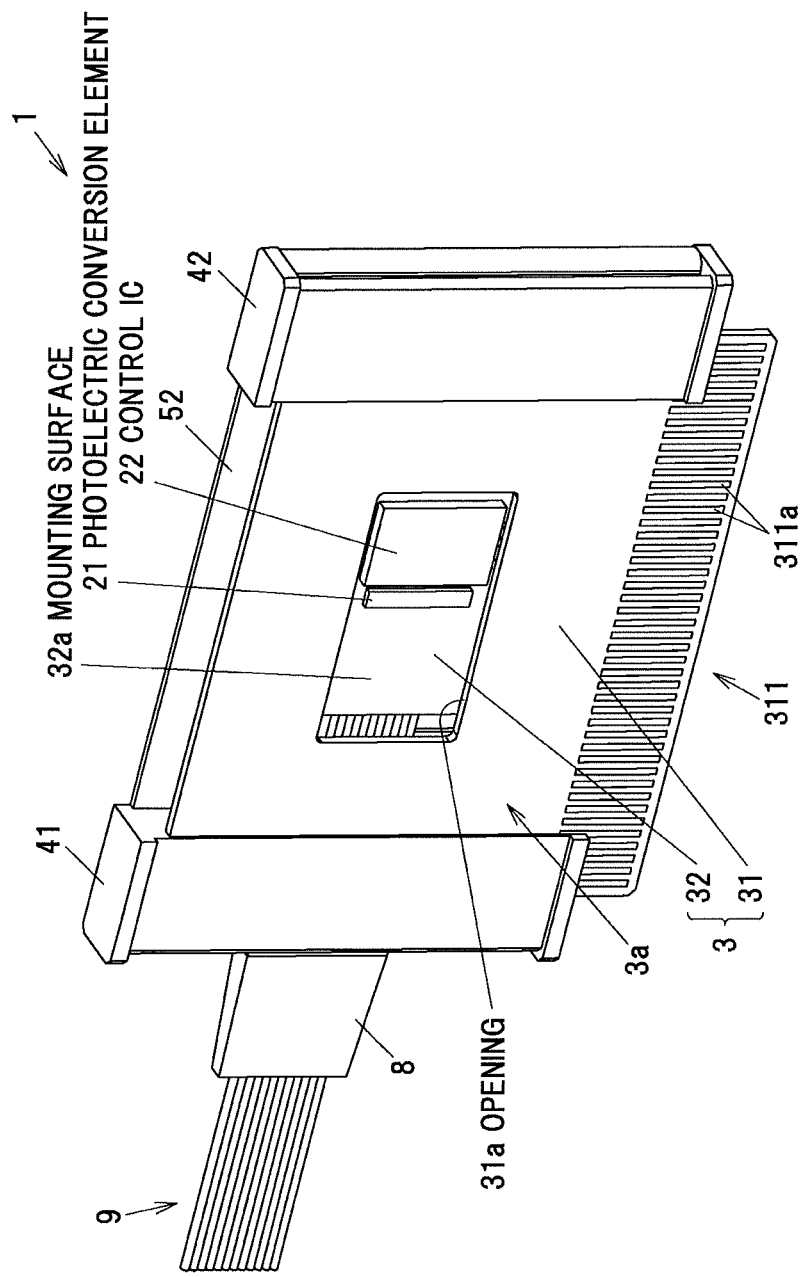
FIG. 2B is a perspective view showing the optical module shown in FIG. 2A in a state that a first cover member is removed.

FIG. 1A is a perspective view showing an optical module in the present embodiment with an optical cable composed of plural optical fibers. FIG. 1B is a perspective view showing the optical module shown in FIG. 1A in a state that the second cover member described later is removed. In addition, FIG. 2A is a perspective view showing the optical module in the present embodiment when viewed from the opposite side to that in FIG. 1A and FIG. 2B is the perspective view of FIG. 2A in a state that the first cover member described later is removed.

An optical module 1 is provided with a photoelectric conversion element 21 optically connected to plural optical fibers 90 included in an optical cable 9, a control IC (Integrated Circuit) 22 for operating the photoelectric conversion element 21, a plate-shaped substrate 3 mounting the photoelectric conversion element 21 and the control IC 22 thereon, a coupling member 4 fixed to both end portions of the substrate 3 so as to sandwich the photoelectric conversion element 21, a cover member 5 coupled to the substrate 3 by the coupling member 4 so as to cover at least a portion of the substrate 3, a lens block 6 as an optical path conversion member for redirecting an optical path between the photoelectric conversion element 21 and the optical cable 9, a plate-shaped retaining member 7 for retaining the optical cable 9 between itself and the lens block 6, and a rubber boot 8 as an elastic member for elastically supporting the optical cable 9 which extends out from between the lens block 6 and the retaining member 7 to the outside of the optical module 1.

The optical cable 9 has plural (twelve in the present embodiment) optical fibers 90 each composed of a core and a cladding. In more detail, the optical cable 9 is formed in a tape shape in which the plural optical fibers 90 arranged in a row so as to be parallel to each other are covered all together by a coating resin 91. For example, an ultraviolet curable resin is used as the coating resin 91.

Structures of Photoelectric Conversion Element 21, Control IC 22 and Substrate 3

The photoelectric conversion element 21 is an element which receives and converts an electrical signal into an optical signal and outputs the optical signal or an element which receives and converts an optical signal into an electrical signal and outputs the electrical signal. A light-emitting element, e.g., VCSEL (Vertical Cavity Surface Emitting Laser), etc., is used for the former case and a light-receiving element, e.g., photodiode, etc., is used for the latter case. Alternatively, a light receiving/emitting element having functions of both the light-emitting element and the light-receiving element may be used. In addition, in the present embodiment, a direction of light incident on or emitted from the photoelectric conversion element 21 is orthogonal to the substrate 3.

When the photoelectric conversion element 21 functions as a light-emitting element, the control IC 22 outputs an electrical signal to cause the photoelectric conversion element 21 to output an optical signal corresponding to the electrical signal. Meanwhile, when the photoelectric conversion element 21 functions as a light-receiving element, the control IC 22 receives an electrical signal of which signal strength varies depending on the light received by the photoelectric conversion element 21.

The entire substrate 3 has a rectangular plate shape. The substrate 3 is composed of a plate-shaped first substrate 31 having a card-edge connector portion 311 formed at an edge thereof and a plate-shaped second substrate 32 joined to the first substrate 31 so as to cover an opening 31a formed at the middle of the first substrate 31. The first substrate 31 and the second substrate 32 are joined by solder bumps 30 at plural electrodes formed on the facing surfaces of the both substrates, and signal transfer between the first substrate 31 and the second substrate 32 and power supply to the photoelectric conversion element 21 and the control IC 22 are carried out via the solder bump 30.

The first substrate 31 is, e.g., a glass-epoxy substrate and is formed to be larger than the second substrate 32. Plural electrical contacts 311a are formed on both surfaces of the card-edge connector portion 311 which is formed at an edge of the first substrate 31. The thickness of the first substrate 31 (excluding a portion on which the electrical contacts 311a or a metal film such as wiring pattern is formed) is, e.g., not less than 0.3 mm and less than 1.0 mm. In the present embodiment, the thickness of the first substrate 31 is set to 0.5 mm.

In addition, in the present embodiment, the first substrate 31 is formed so that, among four sides, a side having the card-edge connector portion 311 formed thereon is longer than other two sides which are orthogonal thereto. In other words, an extending direction of the optical cable 9 housed in the optical module 1 coincides with a longitudinal direction of the first substrate 31.

The photoelectric conversion element 21 and the control IC 22 are mounted on the second substrate 32. In addition, as for the second substrate 32, plural pads for mounting the photoelectric conversion element 21 and the control IC 22 and plural wiring patterns connected to the plural pads, etc., are formed on a surface of a base material which has translucency for a wavelength of light transmitting through the optical cable 9. The second substrate 32 is, e.g., a glass substrate.

The direction of light incident on or emitted from the photoelectric conversion element 21 is orthogonal to a mounting surface 32a of the second substrate 32 and the photoelectric conversion element 21 is optically connected to the plural optical fibers 90 of the optical cable 9 via the second substrate 32. In other words, light transmitted through the second substrate 32 in a thickness direction is incident on the photoelectric conversion element 21, or light emitted from the photoelectric conversion element 21 toward the second substrate 32 transmits through the second substrate 32 in a thickness direction and enters the optical fibers 90.

Structure of Rubber Boot 8

The rubber boot 8 has a retained portion 81 retained by the coupling member 4 and a lead-out portion 82 which is formed integrally with the retained portion 81 along the optical cable 9 toward the outside of the optical module 1. In addition, an insertion hole 8a for inserting the optical cable 9 is formed in the rubber boot 8 throughout the retained portion 81 and the lead-out portion 82.

A pair of protrusions 81a, 81b protruding in a direction parallel to the substrate 3 as well as orthogonal to the extending direction of the optical cable 9 is formed on the retained portion 81. The pair of protrusions 81a, 81b restricts movement of the rubber boot 8 in the extending direction of the optical cable 9 by engaging with a pair of engaging indentations 413a, 413b formed on a below-described recessed portion 413 of a first coupling member 41 (see FIG. 3A). In addition, a second cover member 52 which faces the retained portion 81 restricts the movement of the rubber boot 8 in a direction of slipping out of the recessed portion 413.

Structure of Coupling Member 4

Figure 3A:
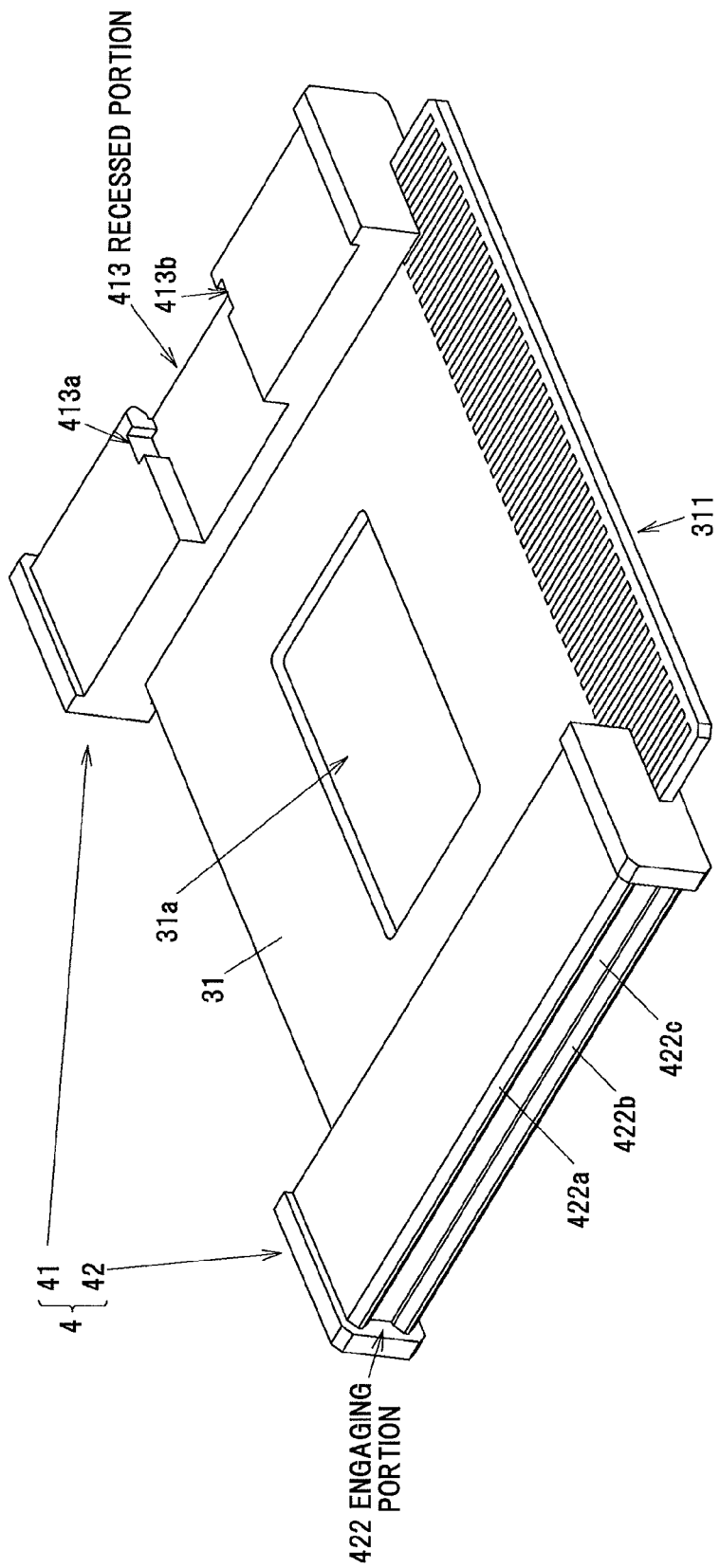
FIG. 3A is a perspective view showing a first substrate and a coupling member.
Figure 4A:
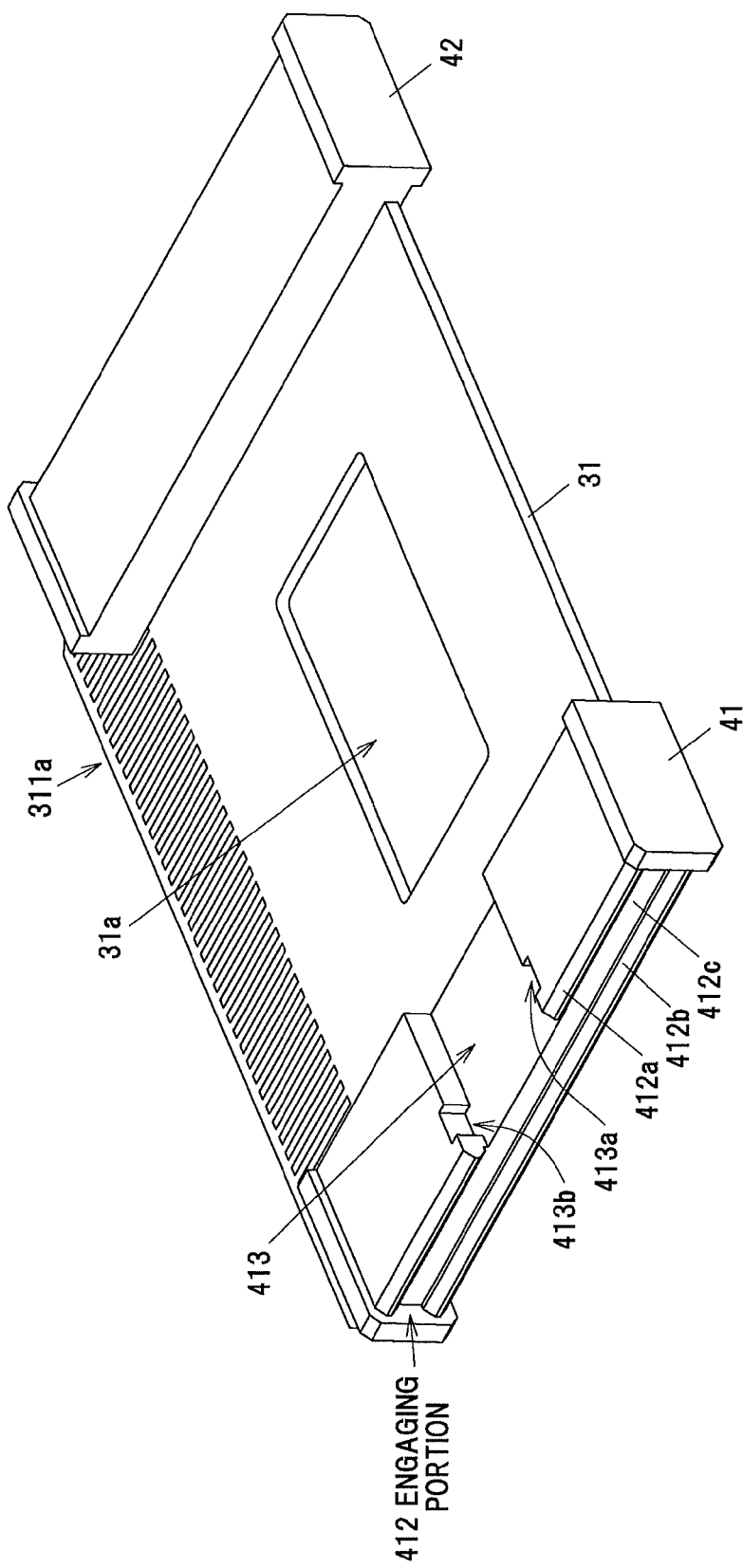
FIG. 4A is a perspective view showing the first substrate and the coupling member when viewed at an angle different from that in FIG. 3A.
Figure 4B:
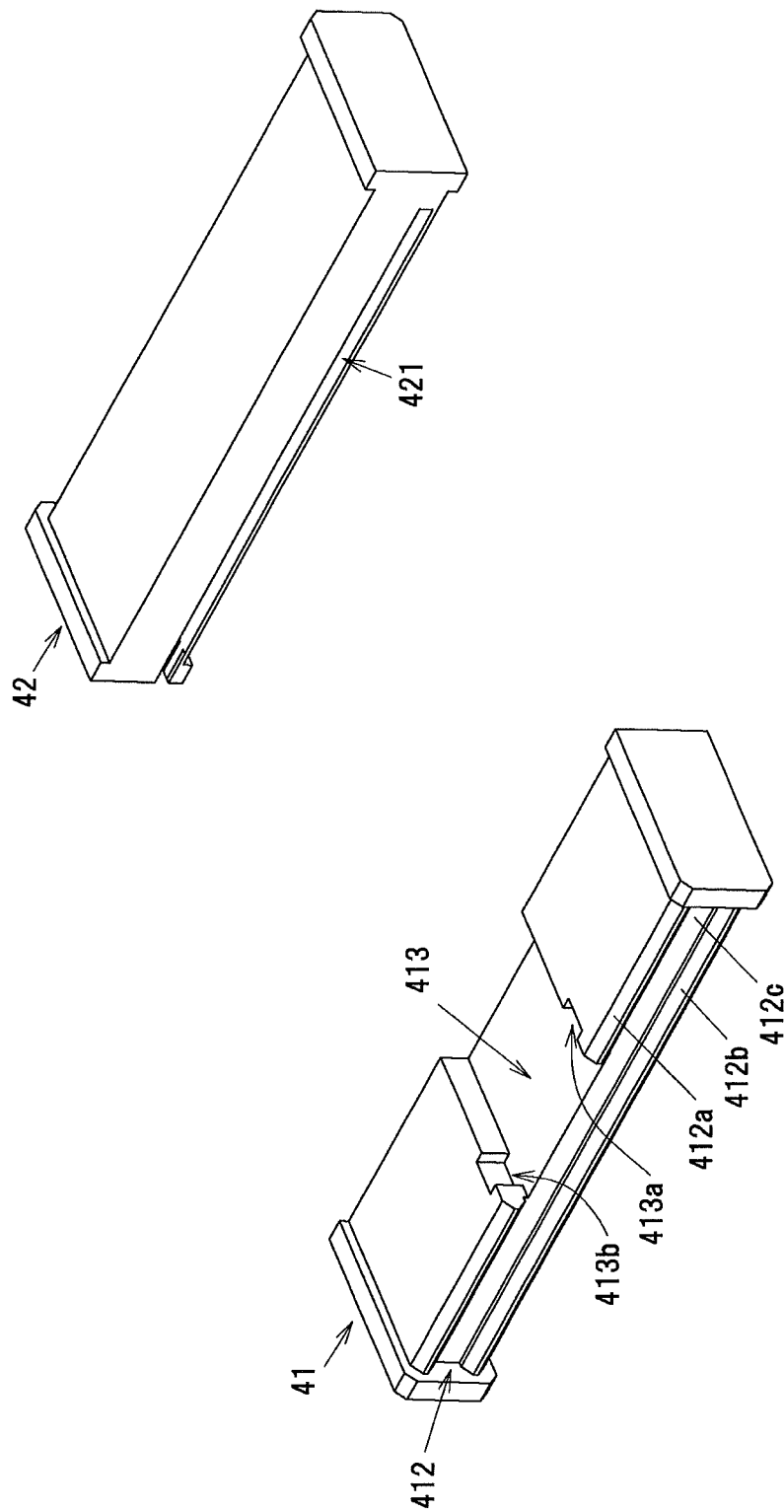
FIG. 4B is the perspective view of FIG. 4A in which illustration of the first substrate is omitted.

FIG. 3A is a perspective view showing the first substrate 31 and the coupling member 4 fixed thereto and FIG. 3B is the perspective view of FIG. 3A in which illustration of the first substrate 31 is omitted. In addition, FIG. 4A is a perspective view showing the first substrate 31 and the coupling member 4 when viewed at an angle different from that in FIG. 3A and FIG. 4B is the perspective view of FIG. 4A in which illustration of the first substrate 31 is omitted.

The coupling member 4 is composed of a first coupling member 41 fixed to a longitudinal end portion of the first substrate 31 and a second coupling member 42 which is formed separately from the first coupling member 41 and is fixed to another longitudinal end portion of the first substrate 31 (an end portion opposite to the end portion having the first coupling member 41 fixed thereto). The first coupling member 41 and the second coupling member 42 are formed of a resin such as ABS (Acrylonitrile Butadiene Styrene) resin, PEI (polyetherimide) or nylon, etc.

A housing portion 411 for housing an end portion of the first substrate 31 is formed on the first coupling member 41. Meanwhile, a housing portion 421 for housing another end portion of the first substrate 31 is formed on the second coupling member 42. The housing portions 411 and 421 are formed in a groove shape with a width corresponding to a thickness of the first substrate 31. Then, the first coupling member 41 and the second coupling member 42 are fixed to the first substrate 31 by fitting the both longitudinal end portions of the first substrate 31 to the housing portions 411 and 421.

In addition, an engaging portion 412 to be engaged with an end portion of the cover member 5 is formed on the first coupling member 41 on an opposite side to the housing portion 411. Likewise, an engaging portion 422 to be engaged with another end portion of the cover member 5 is formed on the second coupling member 42 on an opposite side to the housing portion 421.

As shown in FIGS. 4A and 4B, the engaging portion 412 is composed of protrusions 412a and 412b arranged in parallel in a thickness direction of the first substrate 31 as well as extending in a direction orthogonal to the longitudinal direction of the first substrate 31, and a groove 412c formed between the protrusions 412a and 412b. Meanwhile, as shown in FIGS. 3A and 3B, the engaging portion 422 is composed of protrusions 422a and 422b arranged in parallel in a thickness direction of the first substrate 31 as well as extending in a direction orthogonal to the longitudinal direction of the first substrate 31, and a groove 422c formed between the protrusions 422a and 422b.

Furthermore, the recessed portion 413 for housing the retained portion 81 of the rubber boot 8 is formed on the first coupling member 41. The recessed portion 413 is formed so as to open in the thickness direction of the first substrate 31 and to penetrate the first coupling member 41 in longitudinal direction of the first substrate 31.

In addition, a pair of engaging indentations 413a, 413b is formed on the recessed portion 413 so as to indent toward both directions along a lateral direction of the first substrate 31. As described above, the pair of protrusions 81a, 81b of the rubber boot 8 is engaged with the engaging indentations 413a and 413b.

Although the case where the first coupling member 41 and the second coupling member 42 are separate members has been explained in the present embodiment, the first coupling member 41 and the second coupling member 42 may be formed as an integrated member. In this case, a portion of the coupling member 4 is fixed to a longitudinal end portion of the first substrate 31, another portion of the coupling member 4 is fixed to another longitudinal end portion of the first substrate 31, and the engaging portions 412 and 422 are formed on both end portions of the coupling member 4.

Structure of Cover Member 5

The cover member 5 is composed of a first cover member 51 facing a first principal surface 3a of the substrate 3 (the first substrate 31 and the second substrate 32) which is on a photoelectric conversion element 21 mounting side, and the second cover member 52 facing a second principal surface 3b opposite to the first principal surface 3a. The first cover member 51 and the second cover member 52 are each formed of a plate-shaped metal (a sheet metal) on which a processing such as bending process is carried out.

Figure 5A:
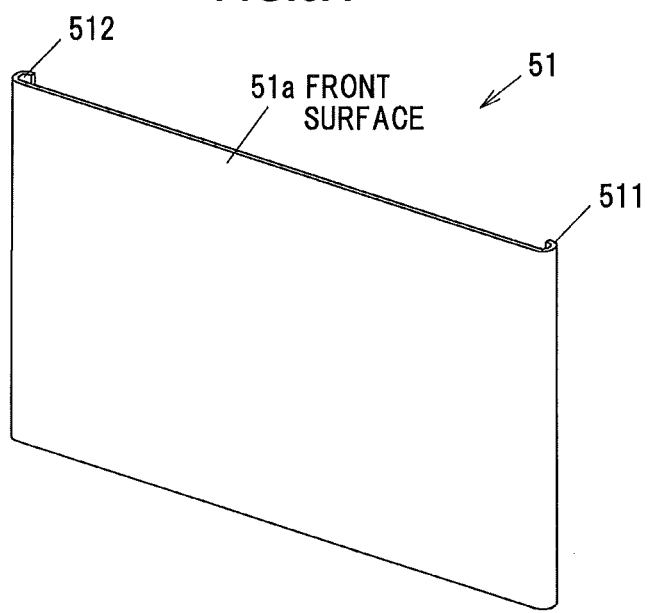
FIG. 5A is a perspective view showing the first cover member when viewed from the front side.
Figure 5B:
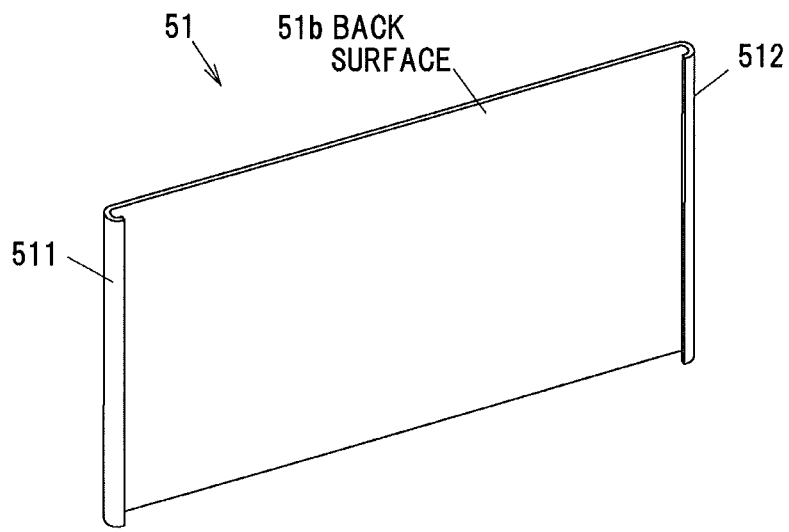
FIG. 5B is a perspective view showing the first cover member when viewed from the back side.
Figure 5C:
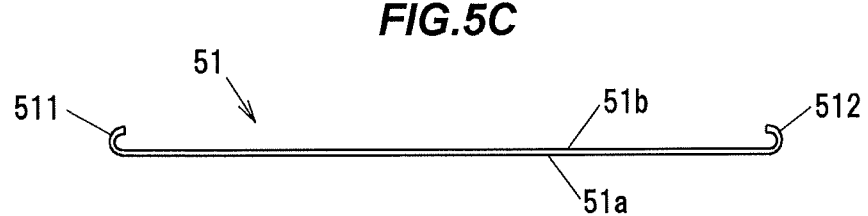
FIG. 5C is a side view showing the first cover member.
Figure 6A:
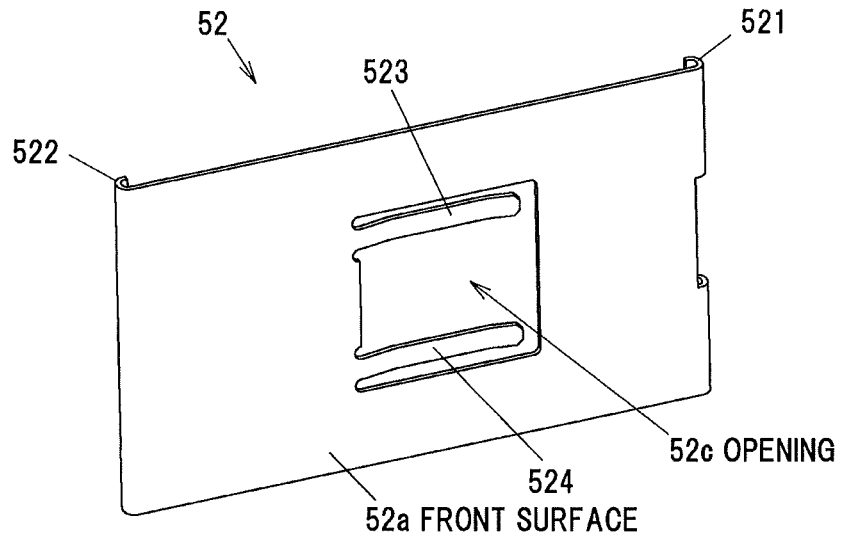
FIG. 6A is a perspective view showing the second cover member when viewed from the front side.
Figure 6B:
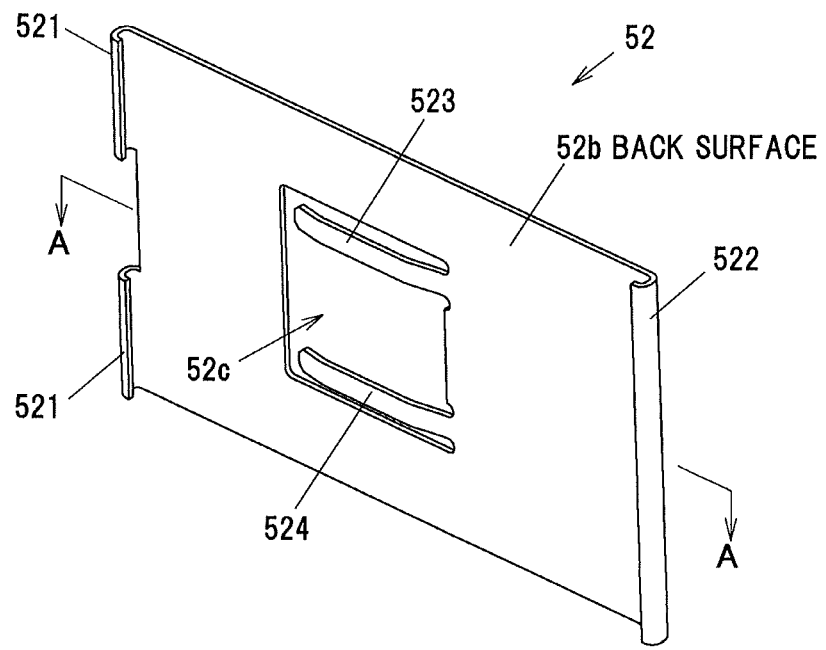
FIG. 6B is a perspective view showing the second cover member when viewed from the back side.
Figure 6C:
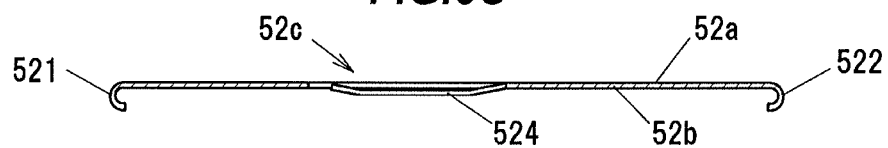
FIG. 6C is a cross sectional view taken on line A-A of FIG. 6B.

FIGS. 5A to 5C show the first cover member 51, wherein FIG. 5A is a perspective view from a front surface 51a side, FIG. 5B is a perspective view from a back surface 51b side and FIG. 5C is a side view. In addition, FIGS. 6A to 6C show the second cover member 52, wherein FIG. 6A is a perspective view from a front surface 52a side, FIG. 6B is a perspective view from a back surface 52b side and FIG. 6C is a cross sectional view taken on line A-A of FIG. 6B.

The first cover member 51, of which back surface 51b faces the first principal surface 3a of the substrate 3, is formed to cover the entire first principal surface 3a. The first cover member 51 has a rectangular shape of which longitudinal direction is parallel to the longitudinal direction of the substrate 3. In addition, a pair of folded-back portions 511, 512 which are folded back toward the middle of the substrate 3 (toward the photoelectric conversion element 21) is formed on both longitudinal end portions of the first cover member 51. In the present embodiment, the folded-back portions 511 and 512 have an arcuate cross section and are bent from the front surface 51a toward the back surface 51b.

An opening 52c penetrating from the front surface 52a to the back surface 52b is formed at the middle of the second cover member 52. The opening 52c is formed at a position in which a portion of the lens block 6 and the entire retaining member 7 can be seen from the front surface 52a side, as shown in FIG. 1A. The second cover member 52, of which back surface 52b faces the second principal surface 3b of the substrate 3, is formed to cover a portion of the second principal surface 3b except a region having the opening 52c.

The second cover member 52 has a rectangular shape in the same manner as the first cover member 51, and a pair of folded-back portions 521, 522 which are folded back toward the middle of the substrate 3 is formed on both longitudinal end portions of the second cover member 52. The folded-back portions 521 and 522 have an arcuate cross section and are bent from the front surface 52a toward the back surface 52b.

In addition, the second cover member 52 has a pair of pressing portions 523, 524 which are formed by bending a portion in a region facing the lens block 6 toward the substrate 3. The pressing portions 523 and 524 are formed to extend in the opening 52c along a longitudinal direction of the second cover member 52 so as to be parallel to each other. The pressing portions 523 and 524 are in contact with a portion of the lens block 6 and elastically press the lens block 6 toward the substrate 3. The lens block 6 is restricted from moving in a direction parallel to the second substrate 32 by engagement with a pair of guide pins 321, 322 provided on the second substrate 32 and is pressed by the pressing portions 523 and 524 of the second cover member 52, thereby fixed to the second substrate 32.

Structure of Lens Block 6

Figure 7A:
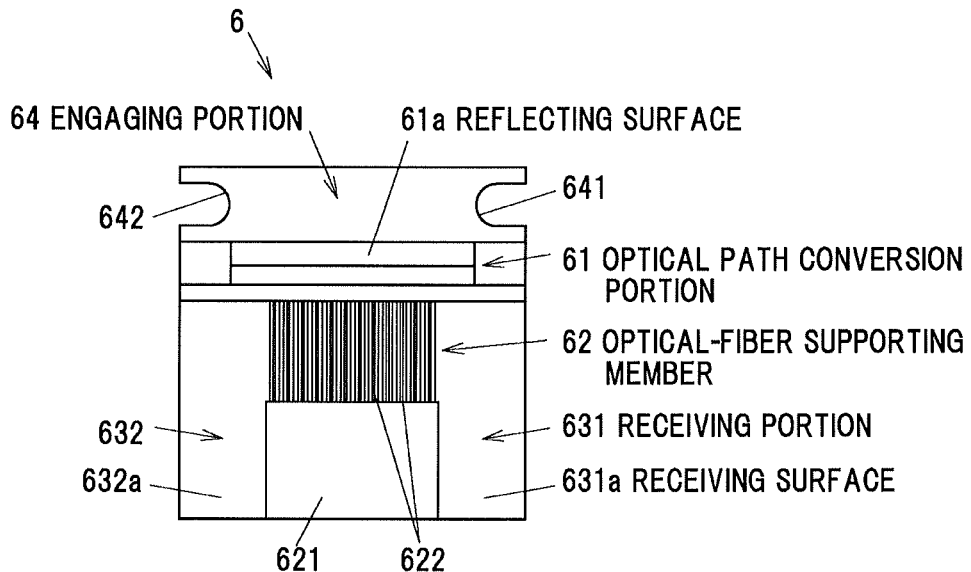
Figure 7B:
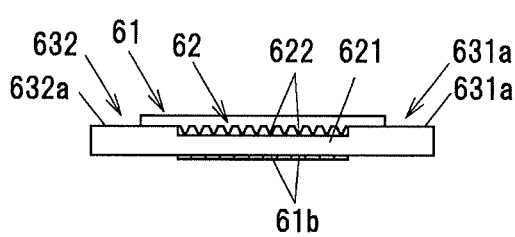
Figure 7C:
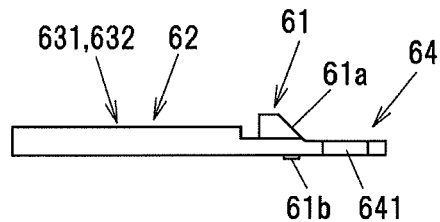
Figure 7D:
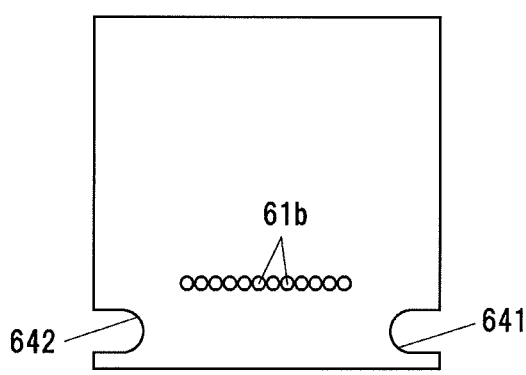

FIGS. 7A to 7D show the lens block 6, wherein FIG. 7A is a plan view, FIG. 7B is a front view, FIG. 7C is a right side view and FIG. 7D is a bottom view.

The lens block 6 is formed of a resin having translucency, e.g., PMMA (polymethylmethacrylate (acrylic)), etc., and integrally includes an optical path conversion portion 61, an optical-fiber supporting member 62, a pair of receiving portions 631, 632, and an engaging portion 64 on which notches 641 and 642 to be respectively engaged with the guide pins 321 and 322 are formed.

In the lens block 6, the optical path of light incident on or emitted from the photoelectric conversion element 21 is converted between the photoelectric conversion element 21 and the plural optical fibers 90 by the optical path conversion portion 61. In more detail, the optical path on the photoelectric conversion element 21 side in a direction orthogonal to the mounting surface 32a of the second substrate 32 is converted by the optical path conversion portion 61 into the optical path on the optical fiber 90 side in a direction parallel to the mounting surface 32a of the second substrate 32.

The optical path is converted by internally reflecting light at a reflecting surface 61a which is formed on the optical path conversion portion 61 along an inclined surface (virtual surface) crossing the second substrate 32 at an oblique angle. In the present embodiment, an angle formed between the reflecting surface 61a and the second substrate 32 is 45°. Meanwhile, the optical path conversion portion 61 is configured so that the optical path on the optical fiber 90 side to be converted by the lens block 6 is orthogonal to a direction of inserting the card-edge connector portion 311 into an other connector (described later). In addition, the reflecting surface 61a is formed to extend along the direction of inserting the card-edge connector portion 311 into the other connector.

Meanwhile, a recess 621 for housing the plural optical fibers 90 covered with the coating resin 91 and plural grooves 622 for supporting the plural optical fibers 90 exposed by removing the coating resin 91 are formed on the optical-fiber supporting member 62. The grooves 622 are formed along a direction parallel to the second substrate 32 as well as orthogonal to an extending direction of the reflecting surface 61a so as to correspond to the respective plural optical fibers 90.

The optical cable 9 is sandwiched and held between the optical-fiber supporting member 62 of the lens block 6 and the retaining member 7 (shown in FIGS. 1A and 1B). The retaining member 7 is formed of, e.g., a resin and is fixed to the lens block 6 by an adhesive, etc.

The pair of receiving portions 631, 632 are formed on both end portions of the lens block 6 so as to sandwich the optical-fiber supporting member 62. The receiving portion 631 has a receiving surface 631a in contact with the pressing portion 523 of the second cover member 52 and receives a pressing force toward the substrate 3 generated by the pressing portion 523. In addition, the receiving portion 632 has a receiving surface 632a in contact with the pressing portion 524 of the second cover member 52 and receives a pressing force toward the substrate 3 generated by the pressing portion 524.

Meanwhile, plural lens portions 61b are formed on the lens block 6 on an opposite side to the reflecting surface 61a of the optical path conversion portion 61. The lens portions 61b are formed in the optical path on the photoelectric conversion element 21 side and function to focus the light emitted from the photoelectric conversion element 21 and entering the optical fiber 90 or the light emitted from the optical fiber 90 and entering the photoelectric conversion element 21.

Operation of Optical Module 1

Figure 8B:
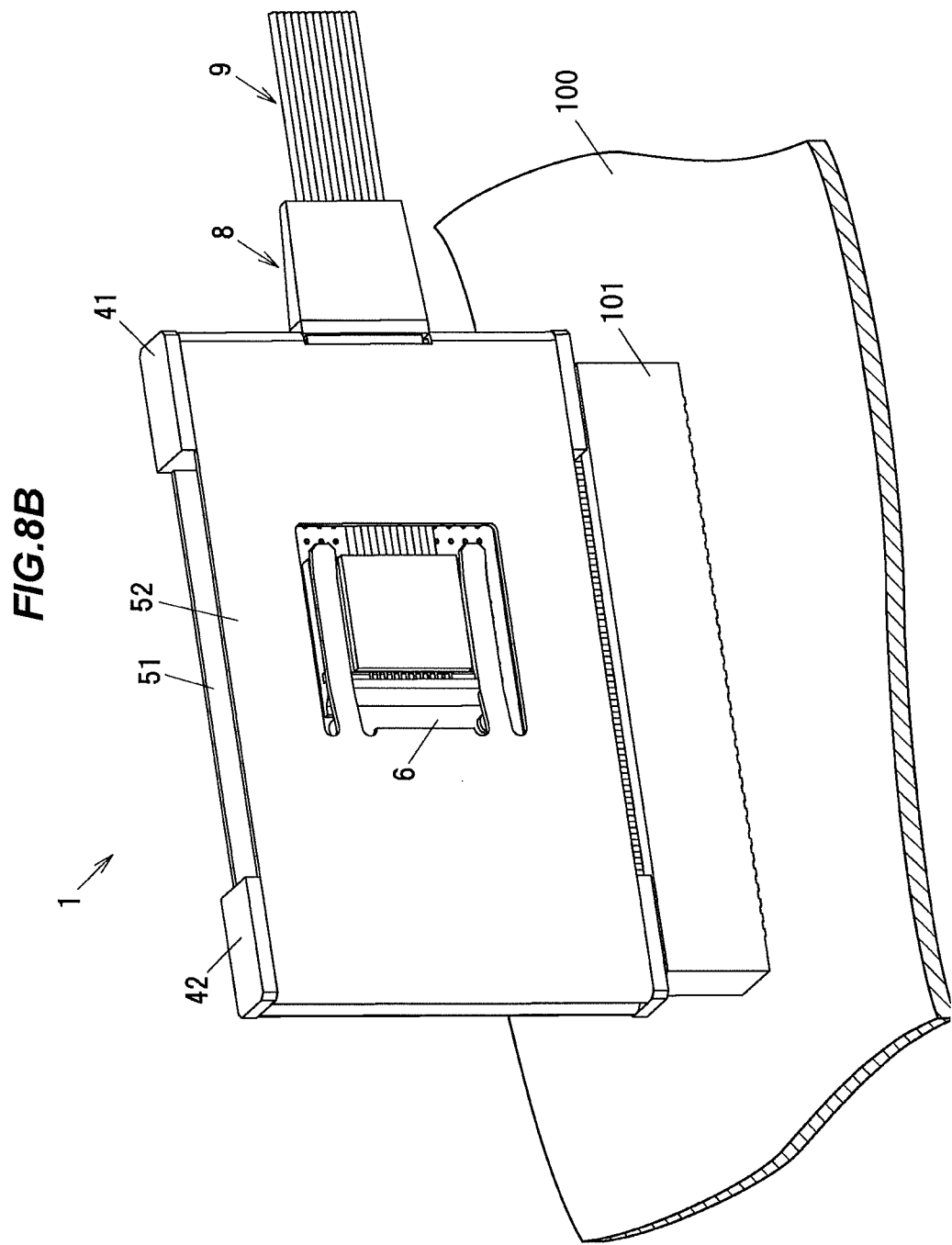
FIG. 8B is a perspective view showing a state that the card-edge connector portion is inserted into the other connector.

FIG. 8A shows a state before the card-edge connector portion 311 of the optical module 1 is inserted into a connector 101 (the other connector) mounted on an electronic circuit board 100 and FIG. 8B is a perspective view showing a state that the card-edge connector portion 311 is inserted into the connector 101.

For the attachment of the optical module 1, the card-edge connector portion 311 is inserted into the connector 101 along the lateral direction of the substrate 3 orthogonal to the longitudinal direction thereof. A direction of leading out the optical cable 9 from the optical module 1 is orthogonal to the direction of inserting the card-edge connector portion 311 into the connector 101. In addition, an array direction of the plural optical fibers 90 inside the optical module 1 is parallel to the insertion direction of the card-edge connector portion 311. In other words, a width direction of the tape-shaped optical cable 9 extending out of the rubber boot 8 is parallel to the direction of inserting the card-edge connector portion 311 into the connector 101. Upon the insertion of the card-edge connector portion 311 into the other connector 101, the substrate 3 (i.e., the lateral direction thereof or the insertion direction thereof) is orthogonal to the surface of the other electronic circuit board 100 on which the other connector 101 is mounted.

By a contact of the electrical contacts 311*a* of the card-edge connector portion 311 with contacts 101*a* of the connector 101, the optical module 1 transfers signals to a non-illustrated active or passive device mounted on the electronic circuit board 100 and receives power supply from the electronic circuit board 100.

FIG. 9 is a cross sectional view showing a main section of the optical module 1. When the photoelectric conversion element 21 is a light-emitting element which converts an electrical signal into an optical signal and outputs the optical signal, an electrical signal is input to the control IC 22 from the electronic circuit board 100 via the connector 101 and the substrate 3, and the photoelectric conversion element 21 is driven based on the electrical signal. The light emitted from the photoelectric conversion element 21 transmits through the second substrate 32 and is incident on the lens block 6 through the lens portions 61*b*. The incident light is internally reflected at the reflecting surface 61*a* of the optical path conversion portion 61 and enters the optical fibers 90.

Meanwhile, when the photoelectric conversion element 21 is a light-receiving element which converts an optical signal into an electrical signal and outputs the electrical signal, the light emitted from the optical fibers 90 and incident on the lens block 6 is internally reflected at the reflecting surface 61*a* of the optical path conversion portion 61 and exits from the lens portions 61*b*. The incident light enters the photoelectric conversion element 21 after transmitting through the second substrate 32 and is converted into an electrical signal. The electrical signal output from the photoelectric conversion element 21 is output to the electronic circuit board 100 via the substrate 3 and the connector 101 by the control IC 22.

In the present embodiment, the optical module 1 can concurrently perform communication on 12 channels. In addition, the lens block 6, the photoelectric conversion element 21 and the control IC 22 may be configured so as to allow one optical fiber 90 to simultaneously perform transmission and reception by using optical signals of which wavelengths are different for transmission and reception.

In addition, as shown in FIG. 9, a first optical path $L_1$ on the photoelectric conversion element 21 side of the reflecting surface 61*a* is orthogonal to a second optical path $L_2$ on the optical fiber 90 side of the reflecting surface 61*a*. In other words, the first optical path $L_1$ is present in a direction orthogonal to the mounting surface 32*a* of the second substrate 32 and the second optical path $L_2$ is present in a direction parallel to the mounting surface 32*a* of the second substrate 32. In the present embodiment, the lens block 6 is supported by the guide pins 321, 322 and a supporting portion 323 provided on the second substrate 32 so that the second optical path $L_2$ is parallel to the longitudinal direction of the substrate 3, i.e., parallel to the electronic circuit board 100.

Meanwhile, as shown in FIG. 9, a portion of the retaining member 7 is located inside the opening 52*c* of the second cover member 52. In other words, although the second cover member 52 overlaps with a portion of the retaining member 7 (a portion of the retaining member 7 on the outer side in a thickness direction) when viewed from a direction parallel to the front surface 52*a* and the back surface 52*b* of the second cover member 52, a contact between the retaining member 7 and the second cover member 52 is avoided by the opening 52*c*.

In addition, the photoelectric conversion element 21 and the control IC 22 are at least partially housed in the opening 31*a* of the first substrate 31.

Functions and Effects of the Embodiment

The following effects are obtained in the embodiment.

(1) Since the first and second cover members 51 and 52 are coupled, at both end portions thereof, to the substrate 3 by the first and second coupling members 41 and 42, it is possible to reduce the size of the optical module 1 in a thickness direction as compared to, e.g., the case where the substrate is housed in a case-shaped member. In addition, it is easy to assemble the optical module 1.

(2) Since an external force acting on the substrate 3 at the time of, e.g., attaching the optical module 1 to the connector 101 is suppressed by the first and second cover members 51 and 52, it is possible to form a thinner substrate 3 than the case of not having the first and second cover members 51 and 52, leading to allow the connector 101 to be downsized. As a result, it is possible to reduce an area on the electronic circuit board 100 occupied by the connector 101 and it is thus possible to contribute to high-density packaging on the electronic circuit board 100.

(3) Since the direction of light incident on or emitted from the photoelectric conversion element 21 is orthogonal to the substrate 3 (the second substrate 32) and the light is redirected by the lens block 6 into a direction parallel to the substrate 3, the optical cable 9 can extend out so as to be parallel to the substrate 3 and it is thus possible to reduce the size of the optical module 1 in a thickness direction.

(4) Since the photoelectric conversion element 21 and the lens block 6 are arranged so as to sandwich the second substrate 32 which has translucency, the photoelectric conversion element 21 and the lens block 6 can be fixed to the second substrate 32 together, which facilitates assembly of the optical module 1.

(5) Since the photoelectric conversion element 21 and the control IC 22 are partially or entirely housed in the opening 31*a* formed at the middle of the first substrate 31, it is possible to further reduce the size of the optical module 1 in a thickness direction.

(6) Since the lens block 6 is pressed against and fixed to the substrate 3 by the pressing portions 523 and 524 of the second cover member 52, the lens block 6 is simultaneously fixed by assembling the second cover member 52. This eliminates a necessity of fixing the lens block 6 to the substrate 3 by, e.g., an adhesive, etc., which facilitates assembly of the optical module 1.

(7) Since the opening 52*c* is formed on the second cover member 52 and a portion of the retaining member 7 is located inside the opening 52*c*, it is possible to further reduce the size of the optical module 1 in a thickness direction. That is, the optical module 1 can be thinned by arranging the second cover member 52 and the retaining member 7 so as to overlap each other in a thickness direction of the optical module 1. In addition, flow of the air through the opening 52*c* allows heat generated in the control IC 22 and the photoelectric conversion element 21, etc., to be released to the outside and it is thus possible to enhance heat dissipation.

(8) Since the optical cable 9 extends out of the optical module 1 through the elastic rubber boot 8, damage to the optical cable 9 caused by being bent at a large curvature can be suppressed. In addition, since the rubber boot 8 is housed in the recessed portion 413 of the first coupling member 41 and is restricted from slipping out of the recessed portion 413 by the second cover member 52 which faces the rubber boot 8, it is easy to assemble the rubber boot 8.

(9) The first and second cover members 51 and 52 are formed of a single sheet metal and are coupled by engagement of the folded-back portions 511, 512, 521 and 522 with the engaging portions 412 and 422 of the first and second coupling members 41 and 42. That is, the first and second cover members 51 and 52 can be coupled by elastic deformation thereof and it is possible to easily assemble the first and second cover members 51 and 52 as compared to the case where the first and second cover members 51 and 52 are fixed by, e.g., tightening screw or crimping, etc.

(10) Since the card-edge connector portion 311 is formed on the substrate 3 (the first substrate 31) and the direction of inserting the card-edge connector portion 311 into the connector 101 mounted on the electronic circuit board 100 is orthogonal to the second optical path $L_2$, it is possible to lead out the optical cable 9 so as to be parallel to the electronic circuit board 100. This prevents the optical cable 9 from protruding from the optical module 1 in a direction orthogonal to the electronic circuit board 100 and it is thereby easy to run the optical cable 9.

(11) Since the first and second cover members 51 and 52 are coupled so as to sandwich the substrate 3 from both sides, it is possible to protect each component covered by the first and second cover members 51 and 52 and deformation of the substrate 3 caused by an external force at the time of, e.g., attaching to the connector 101 can be also appropriately suppressed.

(12) Since the first and second cover members 51 and 52 are formed of a sheet metal, heat generated in the photoelectric conversion element 21 and the control IC 22 can be efficiently dissipated to the outside due to heat conduction.

Figure 10:
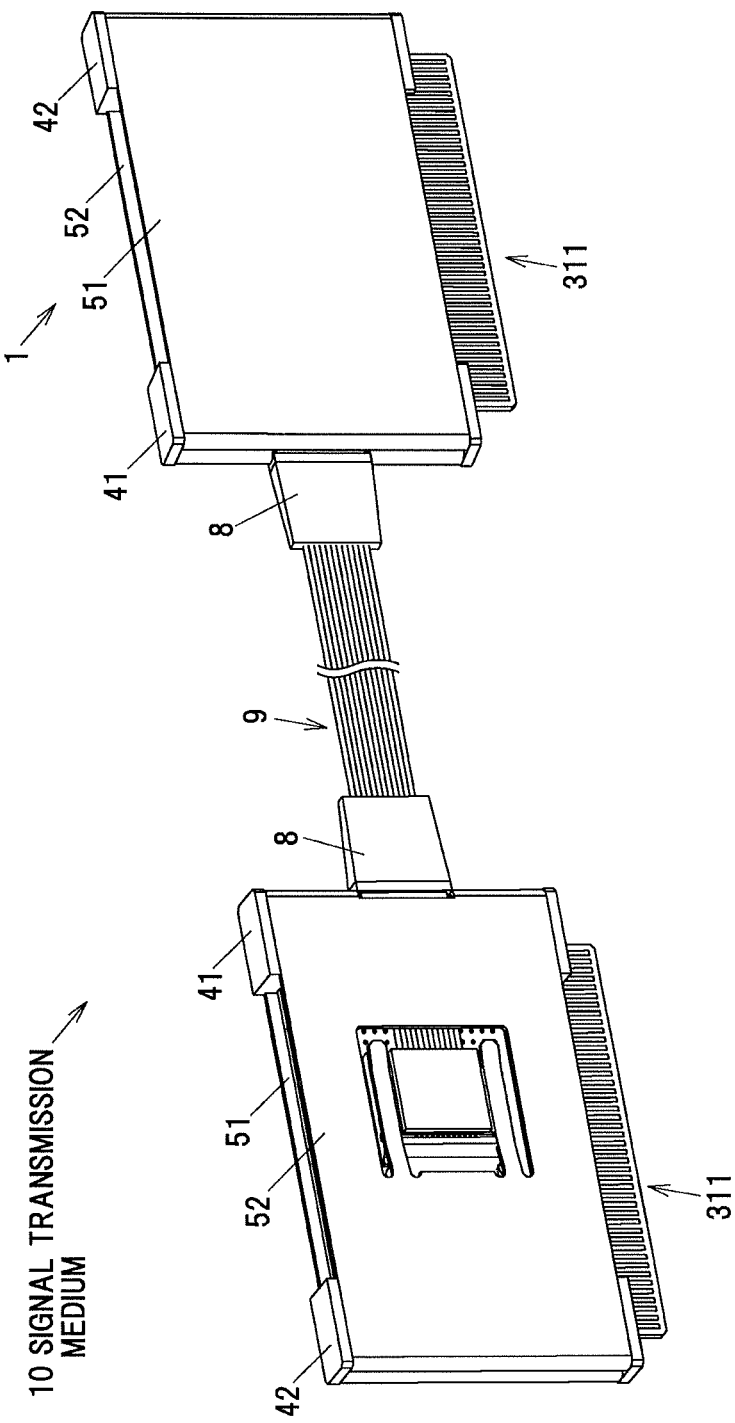
FIG. 10 is a perspective view showing a signal transmission medium in the present embodiment.

A signal transmission medium 10 can be formed by providing a pair of optical modules 1 to both end portions of the optical cable 9, as shown in FIG. 10. In this case, one of the optical modules 1 converts an electrical signal input from the card-edge connector portion 311 into an optical signal and transmits the optical signal through the optical cable 9. Another optical module 1 converts an optical signal transmitted through the optical cable 9 into an electrical signal and outputs the electrical signal from the card-edge connector portion 311. Alternatively, optical signals of which wavelengths are different for transmission and reception may be used to bi-directionally communicate between the pair of optical modules 1. The signal transmission medium 10 allows communication between, e.g., two electronic circuit boards housed in a common rack.

Although the embodiment of the invention have been described, the invention according to claims is not to be limited to the above-mentioned embodiment. Further, it should be noted that all combinations of the features described in the embodiment are not necessary to solve the problem of the invention.

It should be noted that the present invention is not intended to be limited to the above-mentioned embodiment, and the various kinds of embodiments can be implemented without departing from the gist of the present invention. For example, although the case where the optical cable 9 includes plural (twelve) optical fibers 90 has been described in the embodiment, the number of the optical fibers 90 included in the optical cable 9 is not limited, and may be one. In addition, although the case where the substrate 3 is formed by joining two substrates (the first substrate 31 and the second substrate 32) has been described in the present embodiment, the substrate 3 may be formed of a single plate.

What is claimed is:
1. An optical module, comprising:
a photoelectric conversion element optically connected to an optical fiber;
a plate-shaped substrate mounting the photoelectric conversion element;
coupling members removably attached to both end portions of the substrate so as to sandwich the photoelectric conversion element; and
a cover member coupled to the substrate by the coupling members so as to cover at least a portion of the substrate.

2. The optical module according to claim 1, wherein the coupling members comprise a first coupling member removably attached to one end portion of the substrate and a second coupling member that is formed separately from the first coupling member and is removably attached to the other end portion of the substrate opposite to the one end portion.

3. The optical module according to claim 1,
wherein a direction of light to be inputted to or outputted from the photoelectric conversion element is orthogonal to the substrate,
wherein the optical module further comprises an optical path conversion member to redirect an optical path of the light between the photoelectric conversion element and the optical fiber, and
wherein a portion of the optical path conversion member is elastically pressed against and fixed to the substrate by a pressing portion of the cover member.

4. An optical module, comprising:
a photoelectric conversion element optically connected to an optical fiber;
a plate-shaped substrate mounting the photoelectric conversion element;
coupling members fixed to both end portions of the substrate so as to sandwich the photoelectric conversion element;
a cover member coupled to the substrate by the coupling members so as to cover at least a portion of the substrate; and
a first coupling member fixed to one end portion of the substrate and a second coupling member that is formed separately from the first coupling member and is fixed to the other end portion of the substrate opposite to the one end portion;
wherein the cover member comprises a pair of pressing portions that are formed by bending a portion in a region facing the optical path conversion member toward the substrate, and
wherein the optical path conversion member comprises a pair of receiving portions in contact with the pair of pressing portions to receive a pressing force toward the substrate.

5. An optical module, comprising:
a photoelectric conversion element optically connected to an optical fiber;
a plate-shaped substrate mounting the photoelectric conversion element;
coupling members fixed to both end portions of the substrate so as to sandwich the photoelectric conversion element;
a cover member coupled to the substrate by the coupling members so as to cover at least a portion of the substrate; and
a first coupling member fixed to one end portion of the substrate and a second coupling member that is formed separately from the first coupling member and is fixed to the other end portion of the substrate opposite to the one end portion;
wherein the cover member comprises a pair of pressing portions that are formed by bending a portion in a region facing the optical path conversion member toward the substrate, wherein the optical path conversion member comprises a pair of receiving portions in contact with the pair of pressing portions to receive a pressing force toward the substrate, and wherein the cover member further comprises an opening formed in a region between the pair of pressing portions.

6. The optical module according to claim 1, further comprising: an elastic member that comprises an insertion hole formed therein for inserting the optical fiber and elastically supports the optical fiber, wherein the elastic member is at least partially housed in a recessed portion formed on the coupling member and is supported by the cover member that faces the elastic member.

7. The optical module according to claim 1, wherein the cover member is formed such that both end portions thereof are folded back toward the photoelectric conversion element so as to be engaged with the coupling member, and wherein the coupling member comprises an engaging portion for engaging with the both end portions of the cover member.

8. An optical module, comprising:
a photoelectric conversion element optically connected to an optical fiber;
a plate-shaped substrate mounting the photoelectric conversion element;
coupling members fixed to both end portions of the substrate so as to sandwich the photoelectric conversion element;
a cover member coupled to the substrate by the coupling members so as to cover at least a portion of the substrate; and
a first coupling member fixed to one end portion of the substrate and a second coupling member that is formed separately from the first coupling member and is fixed to the other end portion of the substrate opposite to the one end portion;

wherein the substrate comprises at an end portion thereof a card-edge connector portion having a plurality of electrical contacts formed thereon, and wherein an optical path on the optical fiber side to be redirected by the optical path conversion member is orthogonal to a direction of inserting the card-edge connector portion into an other another connector.

9. The optical module according to claim 1, wherein the cover member comprises a first cover member facing a first principal surface of the substrate and a second cover member facing a second principal surface of the substrate, the first principal surface being on a photoelectric conversion element mounting side and the second principal surface being opposite to the first principal surface.

10. The optical module according to claim 1, wherein the cover member comprises a plate-shaped metal.

11. The optical module according to claim 1,
wherein the substrate comprises at an end portion thereof a card-edge connector portion having a plurality of electrical contacts formed thereon, and
wherein the substrate is orthogonal to an other substrate on which an other connector is mounted when the card-edge connector portion is inserted into the other connector.

12. The optical module according to claim 11, wherein the optical fiber is led out parallel to the other substrate when card-edge connector portion is inserted into the other connector.

13. A signal transmission medium, comprising:
an optical fiber; and
a pair of the optical module according to claim 1 that is respectively provided on both end portions of the optical fiber to transmit signals through the optical fiber.

* * * * *